June 10, 1947.  F. B. ALLEN  2,421,977
APPARATUS FOR HANDLING DUST
Filed April 5, 1943
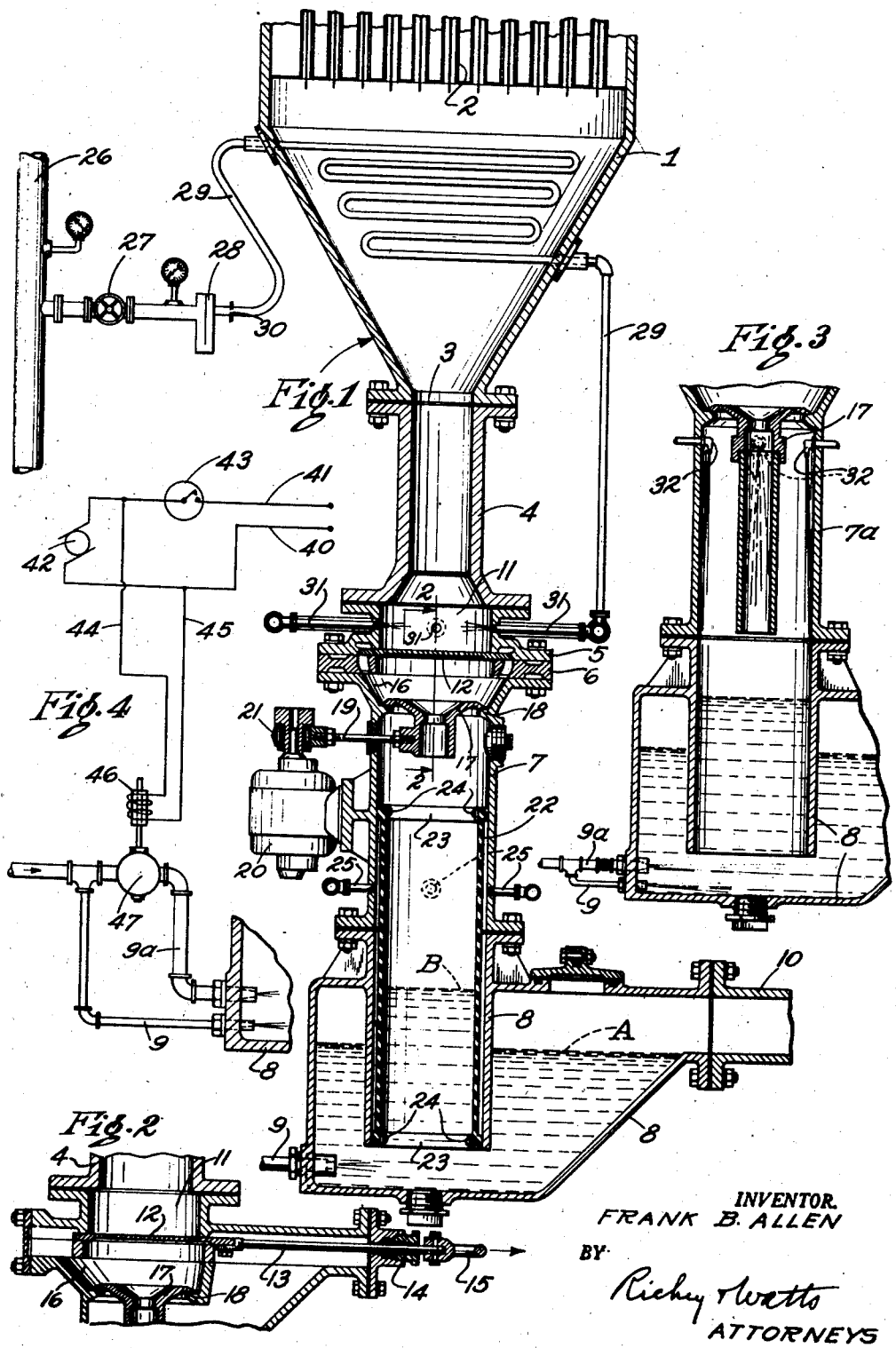
INVENTOR.
FRANK B. ALLEN
BY
Richey Watts
ATTORNEYS Patented June 10, 1947

2,421,977

UNITED STATES PATENT OFFICE 2,421,977

APPARATUS FOR HANDLING DUST

Frank B. Allen, Lower Marion Township, Montgomery County, Pa., assignor to The Allen-Sherman-Hoff Company, Philadelphia, Pa., a corporation of Pennsylvania Application April 5, 1943, Serial No. 481,815

2 Claims. (Cl. 214—17)

This invention relates to the art of handling finely divided solids and is particularly concerned with new and improved methods of and means for handling dust comprising finely divided incombustible residues of fuel which are produced in powdered fuel-burning furnaces.

Some of the ash resulting from the burning of powdered coal in furnaces of steam generating stations is of extremely small size and is carried out of the furnace combustion chamber by the outgoing gases. Such fine ash is known by different names, such as dust, fly ash, precipitator ash and the like, but in this specification the term dust is used to mean and include all finely divided solids whether known by one or another of those names or some other name.

The present invention is predicated on the discovery that dust will flow freely, much like water, when there is a quantity of air distributed in a mass of the dust. According to this invention dry dust is converted into a flowable form by mixing dry air more or less uniformly throughout the mass of dust and in sufficient quantities to confer the free-flowing property on the mixture. The flow of the mixture is controlled so that it will not exceed the capacity of the passage through which it is to flow and means are provided for preventing the dust from clogging the passage.

In the drawings accompanying and forming a part of this specification,

Fig. 1 is a vertical, central, sectional view of one form of apparatus embodying the present invention and with which the present invention may be practiced.

Fig. 2 is a fragmentary, vertical, sectional view taken on line 2—2 of Fig. 1.

Fig. 3 is a fragmentary, vertical, sectional view showing another and preferred form of part of the apparatus of Fig. 1; and Fig. 4 is a wiring diagram for use with the apparatus of Fig. 2.

In Fig. 1 the hopper 1 is shown as being located beneath an electrical precipitator 2 which is positioned in the passageway between a powdered fuel burning furnace and the base of its stack. This hopper is provided to collect dust which is precipitated from the outgoing furnace gases and may be of sufficient capacity to collect and retain the dust which is precipitated over a considerable period of time, preferably 24 hours. Means (not shown) for rapping the precipitator to dislodge dust therefrom may be, and preferably is, incorporated as part of the precipitator 2. It will be understood that more than one of these hoppers and precipitators, and more than one of the devices about to be described, may be employed if desired.

In its lower portion hopper 1 communicates thru discharge opening 3 with a multi-part conduit which, in the modification shown, consists of four parts 4, 5, 6 and 7 and which connects the hopper to a vessel 8. This vessel is provided with main and auxiliary water inlet pipes 9 and 9a and a water and dust outlet pipe 10.

Part 4 is shown as being a simple tube of substantial length. The length of part 4 may be longer or shorter than that here shown or the part may even be omitted entirely, the presence or absence of this part and the length of it when it is present being determined by space limitations or other conditions existing where the apparatus is to be installed. It is secured at its upper end to hopper 1 and at its lower end to conduit part 5 which has a chamber 11 somewhat larger in area than the passage thru part 4. A plurality of air inlet pipes, in this case four, lead into this chamber. Conduit part 6 is connected to the lower end of part 5 and includes a slide 12 which is connected to a rod 13 which extends thru a stuffing-box 14 and is attached to a lever 15 which may be operated manually or otherwise to reciprocate the slide 12 into positions to open or close the passageway thru the conduit.

Part 7 of the conduit is attached at its upper end to the lower end of part 6 and at its lower end to a tubular part of vessel 8 which serves as a continuation of part 7 to a point near the bottom of vessel 8. Part 7 of the conduit has a hopper-shaped chamber 16 in its upper portion at the lower end of which a reciprocable funnel 17 is slidably mounted on inwardly projecting ledges 18. This funnel 17 is attached to a rod 19 which extends thru the wall of the conduit part and is connected to the rotor of motor 20 as by eccentric 21. When the motor is actuated the eccentric rod 19 serves to reciprocate the funnel 17 on its supporting ledges and to feed dust down thru the central passage therethru.

Below funnel 17 part 7 is provided with a flexible sleeve 22 which, as shown, is composed of rubber secured at its ends against the inner surfaces of part 7, as by metal rings 23 and screws 24. Between its ends this sleeve 22 is spaced away from the inner side walls of part 7 to provide a space for fluid, such as air or water, to enter periodically and thereby to flex the walls of the sleeve and vary the cross-sectional area within the sleeve and dislodge therefrom any dust which may be adhering to the sleeve. Pipe lines 25 serve to conduct such fluid into and out of the space between part 7 and sleeve 22.

A main air supply line of the plant is indicated at 26. From this main line a branch line leads thru reducing valve 27 and water separator 28 and connects with line 29 which has a small orifice 30 therein. Beyond the orifice line 29 extends along the walls of hopper 1 and thence to branches 31, which may be about ¼" in diameter when the line 29 is ½" in diameter, and which open into chamber 11 in conduit part 5.

The dust which collects in hopper 1 is substantially free from entrapped air and is, therefore, quite compact and does not flow readily. To convert the accumulated dust from this relatively dense non-flowing condition to a condition which might be described as fluffy, since it offers practically no resistance to an object pushed down into it and which is free-flowing, I have discovered that it is quite desirable to distribute a considerable volume of air more or less uniformly thruout the dust. Admission of air into chamber 11 is provided for that purpose. However, since the dust which accumulates in the hopper 1 is dry and hot and absorbs moisture quite readily, it is important that the air admitted into chamber 11, to flow up thru the dust thereabove and to make the accumulated dust fluffy and free-flowing, should be substantially free from moisture. This drying of the air may be accomplished as follows: The air in the main plant supply line 26 is usually at a pressure ranging from about 50 pounds to about 100 pounds per sq. in. and is also cold and therefore contains more or less moisture. The air pressure in line 26 may be reduced to about 5 pounds per sq. in. by leading it thru the reducing valve 27 in a branch line and then thru separator 28. The expansion of the air which is permitted by the reduction of pressure from 50 pounds or 100 pounds to 5 pounds per sq. in. is accompanied by a sudden reduction in temperature which tremendously reduces the vapor-carrying ability of the air and results in condensation of most, if not all, of the vapor in the air at that low pressure. This condensed moisture is collected in separator 28 and the substantially dry air then passes orifice 30 where a pressure of about 5 pounds exists on one side of the orifice and a lower pressure, either atmospheric or less than atmospheric, exists on the other side of the orifice. Air which passes thru the orifice 30 then flows thru the coils of pipe 29 in hopper 1 where, due to the heat of the gases and dust in the hopper, this air is highly heated with the result that the ability of the air to carry moisture without condensing is considerably increased. The thus treated air enters chamber 11 in the conduit part 5 and is preferably allowed to flow up thru the dust in part 4 of the conduit and in hopper 1 continuously whether the slide 12 is open or closed. It therefore results that the dust which accumulates in the hopper and part 4 of the conduit, in case such a part is employed, is maintained in a fluffy free-flowing condition, which is highly suited to rapid removal.

When the contents of the hopper 1 are to be discharged the slide 12 is moved into conduit opening position, whereupon the free-flowing dust thereabove flows down onto funnel 17, some of it passing thru the funnel regardless of whether the funnel is being reciprocated, and substantially all of it passing thru the funnel during reciprocation thereof. The dust which passes thru funnel 17 falls onto the surface of liquid in sleeve 22. It will be understood that the liquid level within sleeve 22 is substantially higher than it is in vessel 8 because of the vacuum existing within the conduit. When that vacuum is equivalent to 8" or 10" by water gage the level of the liquid in sleeve 22 will be 8" or 10" above the liquid in vessel 8. This difference in liquid levels is indicated in Fig. 1 by lines A and B which designate the surfaces of water in the vessel and in the sleeve respectively. It will be understood that the surface of water in sleeve 22 fluctuates considerably during discharge of dust partly because of variation in vacuum and amounts of dust in the sleeve or vessel, and that such fluctuations result in wetting the sleeve for most of its length.

Since the water or air which is used to flex sleeve 22 is normally cold, as is also the water within the sleeve, the dust which comes into contact with the sleeve or the water is chilled. Since there is considerable moisture in coal and since the flue gases and the air carry this moisture in a vapor form at the temperatures existing in hopper 1, but cannot carry that moisture at lower temperatures, it follows that when the gas and air laden dust is chilled within sleeve 22 much of the moisture vapor condenses when the temperature falls below the dew point. This condensed water forms dew on the inside of the sleeve and dust sticks to it and more dew is formed and more dust sticks to that so that there is a great tendency for the dust to cling to, accumulate on and eventually fill the sleeve 22 with a caked mass which must be dislodged or prevented from accumulating. By opening and closing the valve which admits fluid under pressure into and out of the space between sleeve 22 and part 7 of the conduit periodically, for example, for 10 or 15 seconds once every two or three hours, the walls of the sleeve 22 will be flexed inwardly and outwardly, thereby varying the area within the opening thru the sleeve and cracking and dislodging and permitting accumulated dust to fall from the sleeve into the vessel 8. This alternation of the valve of line 25 may be automatically operated by a time-controlled solenoid device if desired.

It will be understood that so long as slide 12 is closed there will be no flow of air laden dust into part 7 or 7a of the conduit, but that when slide 12 is open and the motor 20 is actuated the flow will be rather rapid. To remove the dust which is thus discharged into vessel 8, water under pressure is admitted thru pipe line 9 and washes this dust as it falls into the tank out thru discharge pipe 10.

The above described apparatus may be operated intermittently or continuously, that is, the dust may be collected in hopper 1 during a certain period of time and periodically removed or it may be continuously removed. It will be understood that the precipitator 2 will continuously remove dust from the gases passing therethru and that some of that dust will continuously fall into the hopper; but that some of the dust so separated will adhere to the precipitator and must be removed therefrom at intervals. Such removal is accomplished by well known rapping means which are used for that purpose. When such rapping mechanism is actuated large quantities of dust are dislodged from the precipitator and fall into the hopper. If the dust is being removed continuously from the hopper such suddenly released quantities of dust may clog the dust-removing apparatus and may not be mixed with a sufficient amount of air to flow freely. For these reasons I prefer to remove dust continuously from hopper 1 and to provide means by which to avoid the clogging of the apparatus as just stated. I wish to avoid troubles incident to the actions just described.

The preferred apparatus for continuous removal may also be used for periodical removal of dust if desired. This apparatus comprises the apparatus shown in Figs. 1 and 2 as modified by substitution of the apparatus of Figs. 3 and 4 for corresponding parts thereof.

In Fig. 3 is shown a part 7a which may replace parts 7, 23, 24 and 25 of Fig. 1. Part 7a is like part 7 except that it includes a plurality of nozzles 32 therewithin which are connected to a source of water, the purpose of the nozzles being to direct small amounts of water down along the inside part 7a, thereby forming its entire circumference and serving to wash off any dust which might otherwise tend to adhere to the inner surface of part 7. Another difference is that the passage thru funnel 17 is extended by tube 33 which extends down to the approximate level of water in the cylindrical portion of vessel 8.

Fig. 3 also shows vessel 8 fragmentarily and main and auxiliary water lines leading thereinto. When dust is being removed from hopper 1 continuously, as it normally falls from the precipitator, only the auxiliary pipe line 9 is conducting water into vessel 8. When the precipitators are rapped and large quantities of dust are to be handled, water is delivered thru main pipe line 9a under greater volume, the flow of water thru lines 9 and 9a being thereby increased sufficiently to carry the larger amounts of dust which must be handled.

In Fig. 4 is shown means for rapping the precipitator and simultaneously actuating a valve in line 9a to adapt the apparatus to handle the suddenly increased amounts of dust. In Fig. 4 lines 40 and 41 are connected to a suitable source of electric power and to a rapping motor 42 for the Cottrell precipitator, a time switch 43 being present in the circuit. Lines 44 and 45 lead from the rapping motor circuit to a solenoid 46 which is associated with a valve 47 in pipe line 9a.

When the time switch 43 is closed current flows in the rapping motor circuit and actuates that motor, thereby dislodging dust adhering to the precipitator and allowing it to fall into the hopper 1. Simultaneously the current also flows thru lines 44 and 45 and energizes the solenoid 46, thereby opening the valve in pipe line 9a and allowing water to flow thru that line as well as thru line 9 into vessel 8 to furnish sufficient water to remove the extra dust incident to the rapping of the precipitator. Obviously the solenoid operated valve may be replaced by a manually controlled valve if desired.

Since the amount of dust delivered by the precipitator between "rappings" may be less than the capacity of the passage thru funnel 17, it may be unnecessary during such times to flow air thru lines 25 and 31 during such times, but such air should flow thruout the time that dust rapped from the precipitator is being removed from hopper 1.

While the present invention has been described specifically in conjunction with the handling of fine incombustible residues resulting from the burning of solid fuel, it will be understood that the invention is not to be limited thereto for it may be employed with any dust which is readily flowable when mixed with sufficient amounts of air. It will also be understood that air dried or heated by means other than the heat of the dust-collecting hopper may be used to mix with dust from any source, and that any suitable means other than sleeve 22 or the longitudinal water jets 32 may be used to prevent the dust from accumulating on the walls of the passageway.

Having thus described the invention so that others skilled in the art may be able to understand and practice the same, I state that what I desire to secure by Letters Patent is defined in what is claimed.

What is claimed is:

1. Apparatus for handling dust comprising a dust-collecting hopper having a discharge opening in its lower portion, a conduit extending downwardly from said hopper opening and having a flexible wall portion, means for discharging air into the dust in the hopper to make a flowable mixture of dust and air, means for controllably feeding said mixture into a lower portion of the conduit, and fluid means for flexing said flexible wall portion to prevent the dust from clogging said conduit.

2. Apparatus for handling dust comprising a dust-collecting hopper having a discharge opening in its lower portion, a conduit extending downwardly from said hopper opening, means for discharging air into the dust in said hopper to make a flowable mixture of dust and air, means for controllably feeding said mixture into a lower portion of the conduit, a flexible sleeve in the conduit, and means for flexing said sleeve to dislodge dust which has adhered to said sleeve.

FRANK B. ALLEN.

REFERENCES CITED

The following references are of record in the file of this patent:

UNITED STATES PATENTS

| Number | Name | Date |
| --- | --- | --- |
| 530,553 | Rourke | Dec. 11, 1894 |
| 573,837 | Whitmore | Dec. 22, 1896 |
| 949,041 | Morscher | Feb. 15, 1910 |
| 1,049,796 | Anderson | Jan. 7, 1913 |
| 1,163,318 | Bryant | Dec. 7, 1915 |
| 1,245,540 | Wegner | Nov. 6, 1917 |
| 1,291,745 | Bradley | Jan. 21, 1919 |
| 1,433,302 | Rothchild | Oct. 24, 1922 |
| 1,559,810 | Trent | Nov. 3, 1925 |
| 1,644,175 | Church | Oct. 4, 1927 |
| 1,839,456 | Anderson | Jan. 5, 1932 |
| 1,971,852 | Goebels | Aug. 28, 1934 |
| 2,061,045 | Ruder et al. | Nov. 17, 1936 |
| 2,123,537 | Marr | July 12, 1938 |
| 2,175,541 | Probert | Oct. 10, 1939 |
| 2,310,377 | Voorhus | Feb. 9, 1943 |
| 2,314,316 | Schlesman | Mar. 16, 1943 |
| 2,316,814 | Schemm | Apr. 20, 1943 |
| 2,347,550 | Foresman | Apr. 25, 1944 |
| 2,370,207 | Thorsten et al. | Feb. 27, 1945 |

FOREIGN PATENTS

| Number | Country | Date |
| --- | --- | --- |
| 219,993 | Germany | July 14, 1908 |
| 432,673 | Germany | Aug. 10, 1926 |
| 529,695 | Germany | Oct. 22, 1932 |
| 752,201 | France | July 10, 1933 |